United States Patent Office 2,868,765
Patented Jan. 13, 1959

2,868,765

POLYVINYL CHLORIDE WITH ALKALI METAL PHOSPHATE AND ORGANOTIN SALT

Albert J. Haefner and Charles W. Montgomery, Baton Rouge, La., assignors to Ethyl Corporation, New York, N. Y., a corporation of Delaware No Drawing. Application July 6, 1955
Serial No. 520,356

1 Claim. (Cl. 260—45.75)

This invention relates to vinyl chloride resin manufacture and more particularly to the manufacture of heat stable polymers of vinyl chloride.

Polyvinyl chloride and copolymers of vinyl chloride are presently manufactured commercially in large volume principally because of their low cost, and their outstanding physical properties. Of particular note is their resistance to oxidation, organic solvents, acids, alkalies and other deteriorating influences. However, at elevated temperatures required for certain processing, the present resins tend to discolor and gel, apparently due to molecular decomposition of the resin.

A wide variety of heat stabilizing agents previously have been suggested for use with vinyl chloride resins. As an example, alkali metal phosphates are suggested for this purpose (U. S. Patent 2,218,645), used in a concentration of from 1 to 10 percent of the resin. The phosphate is employed in finely divided form and incorporated in a vinyl chloride polymer, containing a plasticizer, on a heated mill. The resulting composition is resistant to discoloration by heat or light at 297° F. While unquestionably improving the heat stability of polyvinyl chloride, the above and other stabilizers presently known still leave much to be desired. Optimum heat stability of end products produced from these resins is very desirable. Also, commercial vinyl chloride polymers heretofore produced must be processed below about 330° F.; although higher processing temperatures, i. e., above about 330° F., are frequently desirable so as to permit more rapid and improved processing techniques.

The use of the recommended quantities of phosphate, i. e., above about one percent, reduces appreciably the compatibility of the resin with many desirable plasticizers, e. g., tricresyl phosphate.

It is accordingly an object of this invention to provide a polymer of vinyl chloride having improved heat stability and compatibility with aryl phosphate plasticizers. Another object is to provide a polymeric composition of the above type which can be processed, in the presence or absence of a plasticizer, at relatively high temperatures and for relatively long periods of time without appreciable discoloration or other deteriorating effects. Other objects and advantages of this invention will be more apparent from the following description and appended claims.

The above and other objects are accomplished by incorporating in a vinyl chloride polymer a very small but effective quantity of an alkali metal phosphate, i. e., from 0.001 to 0.070 percent by weight, based on the weight of vinyl chloride polymer. To be effective, this phosphate must be very uniformly distributed on the surfaces of the polymer particles. When this composition is thereafter blended with another stabilizer, more fully discussed hereafter, prior to or during processing of the resin, the resultant composition has exceptional heat stability, materially better than polymer compositions containing a single stabilizer and appreciably better than could be expected from the combined effects of the individual stabilizers. Thus, the end products produced from the resin are exceptionally heat stable. Also, the resin can be readily processed at higher temperatures giving improved plastic products and requiring relatively short processing periods. In addition, the resin of this invention is exceptional compatible with aryl phosphates and other plasticizers.

The alkali metal phosphate should be added to the vinyl chloride polymer, either polyvinyl chloride or copolymers of vinyl chloride, following polymerization by thoroughly slurrying or otherwise mixing the same with the resin, preferably using a water medium. The quantity of alkali metal phosphate initially mixed with the polymer depends largely on the particular processing technique employed in the treatment. Thus, exact quantities of alkali metal phosphate can be mixed with the resin and the resin thereafter dried. Normally, it is preferred to use a pre-wash to remove trace quantities of catalyst. Alternatively, excess alkali metal phosphate can be employed and subsequently removed. Thus, following polymerization, the phosphate can be directly added to the polymerization medium or a diluted polymerization medium. When exact quantities of alkali metal phosphate are added, the resin is merely dried. However, preferably, excess quantities are added and the excess is removed by centrifugation or by other liquid-solid phase separation techniques. When it is desired to employ even greater excesses of alkali metal phosphate, the polymerization medium can be diluted before or after addition of the alkali metal phosphate. Also, a subsequent wash can be employed to remove excess phosphate, with or without prior dilution of the polymerization medium. Normally, best results are obtained by mixing the resin with excess phosphate, preferably in the polymerization medium, followed by a controlled wash to provide a resin having the critical alkali metal phosphate uniformly distributed on the polymer particles. When an excess, from about 0.01–5 and preferably from about 0.1 to 3 parts of phosphate is employed per 100 parts of resin, a water wash is used of from about 0.1–20, preferably 0.5–10, parts of water per part of resin.

The following examples illustrate the present invention but should not be construed as in any way limiting the same.

Example 1

To a water jacketed autoclave provided with a stirrer was fed:

|  | Parts |
|---|---|
| Water | 225 |
| Vinyl chloride | 100 |
| Lauroyl peroxide | 0.3 |
| Dioctyl sulfosuccinate | 0.1 |
| Methyl cellulose | 0.1 |

The dioctyl sulfosuccinate was first dissolved in water at a temperature of about 75° C. A part of this solution was used to make a paste of the methyl cellulose which was then stirred into the remaining water-dioctyl sulfosuccinate solution by stirring for a period of about 9 hours. This solution was then added to the autoclave. The lauroyl peroxide catalyst was added and the autoclave purged with vinyl chloride. The vinyl chloride (100 parts) was then blown into the autoclave and polymerized at a temperature of 50° C. for a period of 11 hours, at which time the pressure dropped and the excess vinyl chloride was vented. Disodium phosphate was added in an amount equivalent to 2 percent based upon the original charge of vinyl chloride and the mixture was stirred for 1½ hours. The polymerization reaction mixture was thereafter centrifuged and washed with ½ gallon of water per pound of resin. Eighty-three percent of the vinyl chloride was polymerized. The so treated polymer contained 0.04 percent disodium phosphate based upon the polyvinyl chloride resin.

One hundred parts of the resin prepared as above was mixed with 25 parts dioctylphthalate, 25 parts of tricresyl phosphate, 2 parts of barium-cadmium laurate (co-precipitated), 2 parts of epoxidized soybean oil with iodine number of 5, and 1 part of triphenyl phosphite. This mixture was milled into a homogeneous sheet at 335° F. Sections of this sheet were heated in an air circulating oven at a temperature of 342° F. for a period of 180 minutes without discoloration or other deterioration of the polymer.

Example II

This is a comparative test illustrating an excessively high concentration of phosphate. Example I was repeated except that less water was used to wash out the excess disodium phosphate, the final product having a disodium phosphate content of 0.26 percent, based upon the polyvinyl chloride. When this resin was heated at a temperature of 342° F. for 90 minutes the polymer darkened appreciably and became brittle. Thus, with a resin containing about six times the quantity of phosphate but still less than previously recommended, the heat stability was less than ½ that of Example I.

Example III

Example II was repeated except that the final polymer contained 0.07 percent by weight disodium phosphate. The polymer is tested according to procedure of Example I and began to darken somewhat after 120 minutes but did not decompose.

Example IV

Example I was repeated except that sufficient water was used during the washing step to lower the disodium phosphate content to 0.02 percent. The polymer was heat treated under the conditions of Example I and showed no thermal decomposition after 135 minutes.

Example V

As another comparison test, Example I was repeated except that no co-stabilizer was added. The polymer was completely black after 3 minutes.

Example VI

This is another comparative example illustrating the use of a resin containing the conventional stabilizer in the absence of disodium phosphate. Example I was repeated except that no disodium phosphate was added to the polymer. Dibutyl tin dilaurate (3 parts) was thoroughly mixed with the resin to stabilize the same. Upon heat treatment of a sheet at 342° F. for 45 minutes, the polymer exhibited appreciable discoloration.

Example VII

As a direct comparison with the Examples V and VI, a resin as prepared as in Example I containing 0.04 percent by weight disodium phosphate and 3 parts of dibutyl tin dilaurate. The resin was heat treated as described in Example I above. The resin showed no discoloration after 90 minutes of treatment. Thus, while the phosphate was incapable of thermal stabilizing the polymer for more than 3 minutes (Example V) and the dibutyl tin dilaurate did not stabilize the resin for more than 45 minutes (Example VI), the stabilizing effect of the tin stabilizer and disodium phosphate combination is essentially double the total effect of the individual stabilizers, indicating an appreciable synergistic effect.

Example VIII

Example I is essentially repeated, producing resins containing 0.005, 0.01, 0.02 and 0.06 percent by weight disodium phosphate, based upon the weight of the polymer. Generally similar results are obtained.

Example IX

Example I is repeated except that trisodium phosphate is employed instead of disodium phosphate. When the final resins contain 0.06 percent or 0.04 percent by weight of trisodium phosphate, similarly heat stable resins are obtained.

Example X

When Example I is repeated using monosodium phosphate and a resin is obtained containing 0.01 weight percent of this phosphate, the resultant polymer is also thermally stable.

Example XI

Example I is repeated except that the vinyl chloride is copolymerized with vinyl acetate and the copolymer similarly treated with disodium phosphate. The weight ratio of vinyl chloride to vinyl acetate is charged to the reactor is 9:1. The resultant copolymer has exceptional heat stability.

Example XII

Example X is repeated except that the vinyl chloride is copolymerized with unsymmetrical dichloro difluoro ethylene with similar results.

Example XIII

Example I is repeated except that 0.1 part of phosphate was added per 100 parts of resin and 6 parts of water were employed as a wash per part of resin. The product was similarly heat stable.

Example XIV

Example I is repeated with similar results except that dilithium phosphate is employed instead of disodium phosphate.

Example XV

Example I is repeated except that dipotassium is employed instead of disodium phosphate. A similarly heat stable resin is obtained.

Example XVI

Example I is repeated except that the resin is mixed with 2 parts of barium-cadmium laurate (co-precipitated) but in the absence of the soybean oil and triphenyl phosphite. The resultant polymer when treated according to Example I is heat stable for a period of at least 180 minutes.

Example XVII

The reactor of Example I is charged with 100 parts of liquid vinyl chloride under pressure, 100 parts of methyl alcohol, 125 parts water (mixed as an equal volume aqueous alcohol mixture), 0.15 parts of lauroyl peroxide and 0.1 part of methyl cellulose (1500 CPS grade) are also charged to the reactor. The contents are agitated at 50° C. for 25 hours. The resultant polyvinyl chloride resin is treated with disodium phosphate according to the procedure of Example I. The resulting resin has excellent thermal stability.

The above examples illustrate the preparation of vinyl chloride polymers containing various concentrations of alkali metal phosphates within the range of 0.001 to 0.070 percent by weight. A more preferred concentration range is from 0.01 to 0.05 percent by weight phosphate based on the vinyl chloride polymer. When the above examples are repeated making a resin containing 0.002, 0.008, and 0.05 percent by weight of disodium phosphate, similar results are obtained.

The alkali metal phosphate can be mono- or polybasic or can be potassium or lithium phosphates as illustrated by the above examples. When the monopotassium, monolithium, tripotassium, and trilithium phosphates are employed in the above examples, suitable heat stable resins are produced.

The vinyl chloride polymer, including the homopolymer or copolymers, can be produced by any conventional polymerization technique. Thus, the vinyl chloride polymer can be produced by suspension, emulsion, or bulk polymerization.

Copolymers of vinyl chloride suitable for this invention are illustrated in Examples XI and XII. When these examples are repeated using other or additional monomers comparable results are obtained. The above examples can be carried out using, as the comonomer, methyl acrylate, ethyl acrylate, 2-ethylhexyl acrylate, vinyl bromide, vinyl fluoride vinylidene chloride, and other compounds containing a $CH_2=C$ group. Other examples are methyl methacrylate, vinyl butyrate, vinyl hexyl ketone, and acrylonitrile.

The phosphate containing vinyl chloride resin can be co-stabilized with a wide variety of known thermal stabilizers, in addition to those illustrated in the above examples. Typical examples are calcium stearate, strontium naphthenate (in ketone solvent), dibutyltin, dibenzene sulfonamide, anhydrobisdibutyl polystannanediol dibutyl ester, cadmium ricinoleate, barium laurate, cadmium 2-ethyl hexoate, cadmium 2-ethyl hexoate-naphthenate mixture, zinc 2-ethyl hexoate, anhydrous sodium pentaoctyl tripolyphosphate, epichlorohydrin, diphenylolpropane, cadmium laurate, tribasic lead sulfate, tribasic lead maleate, dibasic lead phthalate, sodium pentacapryl tripolyphosphate, dibutyl tin diacetate, dibutyl tin maleate, strontium ricinoleate, barium ricinoleate and cadmium ricinoleate.

The concentration of the co-stabilizers is important but not critical. In general, the concentration of co-stabilizer should be between about 0.01 to 10 parts per 100 parts of resin. A more preferred concentration range is from about 1 to 5 parts per 100 parts of resin. When the above examples are repeated employing 1, 3, 6 and 8 parts of co-stabilizer, similar results are obtained.

The above examples illustrate the use of a controlled quantity of water wash to obtain the desired phosphate concentration in the resin. When these examples are repeated except that an alkali metal phosphate water solution is added to the resin and thereafter the phosphate partially removed by centrifugation to produce a resin containing the desired phosphate concentration, similar results are obtained. When the latter technique is employed, it is preferred to prewash the resin with pure water to remove trace amounts of peroxide catalyst which lends instability to the resin during subsequent processing.

The vinyl chloride polymer containing the critical quantity of alkali metal phosphate and preferably also containing co-stabilizer is highly compatible with a wide variety of conventional plasticizers. In addition to the plasticizers illustrated in the above examples, the vinyl polymer of Example I can be blended with dibutyl phthalate, di-n-octyl phthalate, triphenyl phosphate, dibutyl sebacate, and fatty acid monoesters of stearic acid and oleic acid. Other typical examples of suitable plasticizers are dimethyl-, diethyl-, di-isoctyl-, dicapryl-, and higher phthalates. Other aliphatic diesters can be employed including the adipates, azelates, and the glycol esters. Epoxy esters, such as the glycerides and alkyl epoxy stearates can also be employed. Frequently mixtures of two or more of the above plasticizers are preferred.

The plasticizers can be used in a total concentration of from 10 to 100 weight percent based upon the weight of the vinyl chloride polymer. In most cases a concentration from 20 to 70 percent is employed. For processing films and similar end products a concentration of 40 to 60 percent is preferred. When the above examples are repeated using 30, 40 and 70 weight percent of the plasticizer mixture, or with those plasticizers discussed above, similar results are obtained.

As pointed out above, the polymerization conditions are not critical. The polymerization temperature can range from about 30 to 70° C. although temperatures from 40 to 60° C. are preferred. The polymer temperature controls to a large degree the molecular weight of the resin. Temperatures of 40° and 60° C. in the above examples give similar results but increase and decrease respectively the molecular weight of the final polymer.

Either water soluble or monomer soluble catalysts can be employed, depending largely on the particular type of polymerization desired. Any of the usual materials are suitable in the above Examples I and XVII, including benzoyl peroxide, caprylyl peroxide, hydrogen peroxide, ammonium persulfate, potassium ferricyanide, and sodium perborate. Mixtures of two or more of these catalysts can be used.

The polymerization can be carried out in the presence of buffer salts, such as sodium bicarbonate, sodium phosphate, lead acetate, and the like. When alkali metal phosphates are employed, any phosphate remaining in the resin must be compensated for in the after treatment. In prior processing, using a phosphate as a buffer, the resin is washed to remove trace quantities of catalyst which removes essentially all of the phosphate from the resin. Thus, when using a buffer, it is preferred to wash the resin as in the conventional process prior to the after treatment with an alkali metal phosphate.

Various suspending and emulsifying agents can be employed other than those illustrated in the above examples. Specific types and suitable concentrations are disclosed in U. S. Patent 2,528,469. Other suitable polymerization conditions, such as water concentration, agitation and catalysts are also disclosed in the latter patent.

The vinyl chloride polymers of this invention are useful for the production of sheets, films, extruded products and molded articles.

We claim:

A highly heat stable vinyl chloride polymer which is compatible with aryl phosphate plasticizers comprising an intimate mixture of a vinyl chloride polymer containing at least 90% vinyl chloride units, any remaining units being composed of copolymerizable monomers containing a $CH_2=C<$ group, from 0.001 to 0.070 weight percent of an alkali metal phosphate as a heat stabilizer, and from 0.1 to 10 weight percent of a tin-containing stabilizer selected from the group consisting of a dibutyltin dilaurate, dibutyltin diacetate and dibutyltin maleate, said weight percent being based on weight of said polymer.

References Cited in the file of this patent

UNITED STATES PATENTS

| | | |
|---|---|---|
| 1,932,889 | Groff | Oct. 31, 1933 |
| 2,218,645 | Japs | Oct. 22, 1940 |
| 2,482,038 | Temple | Sept. 13, 1949 |
| 2,604,459 | Jankowiak | July 22, 1952 |
| 2,647,296 | Shive | Aug. 4, 1953 |
| 2,654,718 | Grummit et al. | Oct. 6, 1953 |

OTHER REFERENCES

Schildknecht: Vinyl and Related Polymers, pub. John Wiley and Sons, 1952, pages 423, 426–428.